United States Patent
Lin et al.

(10) Patent No.: US 10,725,568 B1
(45) Date of Patent: Jul. 28, 2020

(54) SCROLL MODULE

(71) Applicant: Primax Electronics Ltd., Taipei (TW)

(72) Inventors: Jia-Hung Lin, Taipei (TW); A-Ming Chang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/548,978

(22) Filed: Aug. 23, 2019

(30) Foreign Application Priority Data

Jun. 28, 2019 (TW) .............................. 108122934 A (51) Int. Cl.
*G06F 3/0354* (2013.01)
*G06F 3/0362* (2013.01)

(52) U.S. Cl.
CPC ........ *G06F 3/0362* (2013.01); *G06F 3/03543* (2013.01)

(58) Field of Classification Search
CPC ........................... G06F 3/03543; G06F 3/0362
See application file for complete search history.

(56) References Cited

U.S. PATENT DOCUMENTS

| | | | | |
|---|---|---|---|---|
| 7,616,188 | B1* | 11/2009 | Blandin | G06F 3/03543 345/163 |
| 2003/0025673 | A1* | 2/2003 | Ledbetter | G06F 3/0312 345/163 |
| 2007/0109152 | A1* | 5/2007 | Wald | H03K 17/969 341/31 |
| 2007/0222752 | A1* | 9/2007 | Hsieh | G06F 3/0312 345/163 |
| 2009/0122012 | A1* | 5/2009 | Bohn | G06F 3/03543 345/163 |
| 2010/0265180 | A1* | 10/2010 | Lu | G06F 3/0317 345/166 |
| 2011/0025311 | A1* | 2/2011 | Chauvin | G01D 5/145 324/207.25 |
| 2014/0015752 | A1* | 1/2014 | Lin | G06F 3/03543 345/166 |
| 2014/0333536 | A1* | 11/2014 | Tee | G06F 3/0312 345/163 |
| 2015/0112457 | A1* | 4/2015 | Chan | H05B 45/20 700/83 |
| 2018/0364817 | A1* | 12/2018 | Ota | B60K 37/06 |
| 2019/0094994 | A1* | 3/2019 | Tsai | G06F 3/0362 |
| 2019/0272048 | A1* | 9/2019 | Lin | G06F 3/03543 |

\* cited by examiner

*Primary Examiner* — Ryan A Lubit
(74) *Attorney, Agent, or Firm* — Kirton McConkie; Evan R. Witt (57) ABSTRACT

The present invention provides a scroll module applicable to a mouse, including: a scroll and a rotating element. The rotating element is installed in a groove of the scroll, and a first rotating shaft of the rotating element has light penetrability.

13 Claims, 7 Drawing Sheets

SCROLL MODULE

FIELD OF THE INVENTION

The present invention relates to a scroll module, and in particular to a scroll module applied to a mouse.

BACKGROUND OF THE INVENTION

A mouse is used to control a cursor on a computer screen so as to operate the computer. In addition to a left button and a right button, a scroll of the mouse is the most commonly used button for general users, for example, browsing a webpage or moving the cursor by rotating the scroll, or outputting middle button signals or switching between different functional modes by pressing the scroll.

Figure 1:
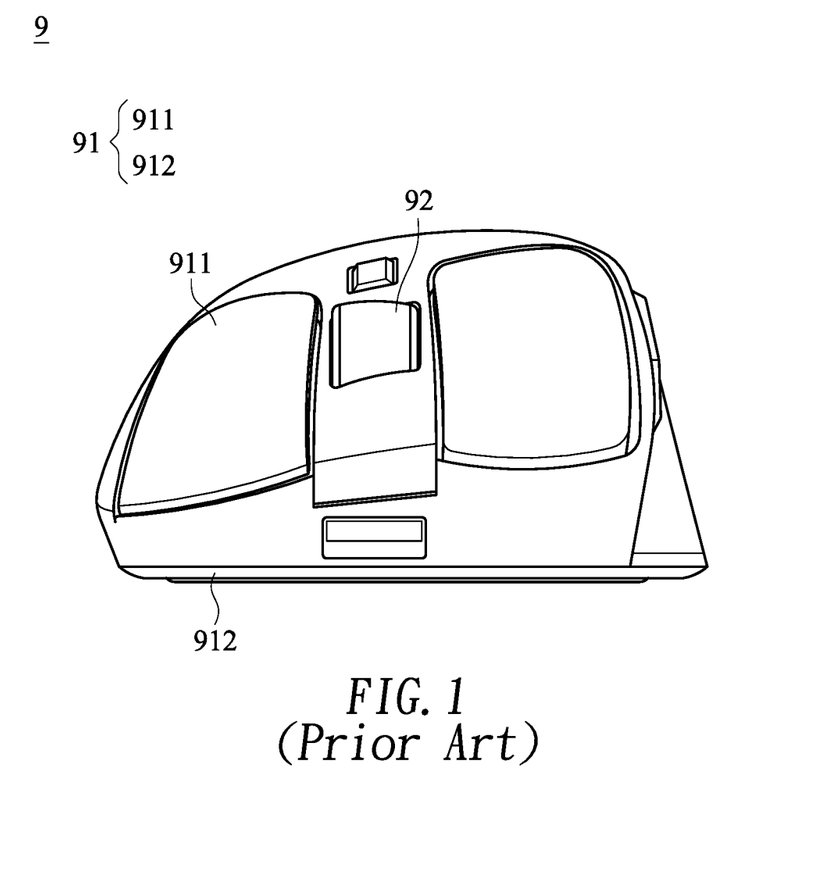
FIG. 1 is a front view of a conventional mouse.
Figure 2A:
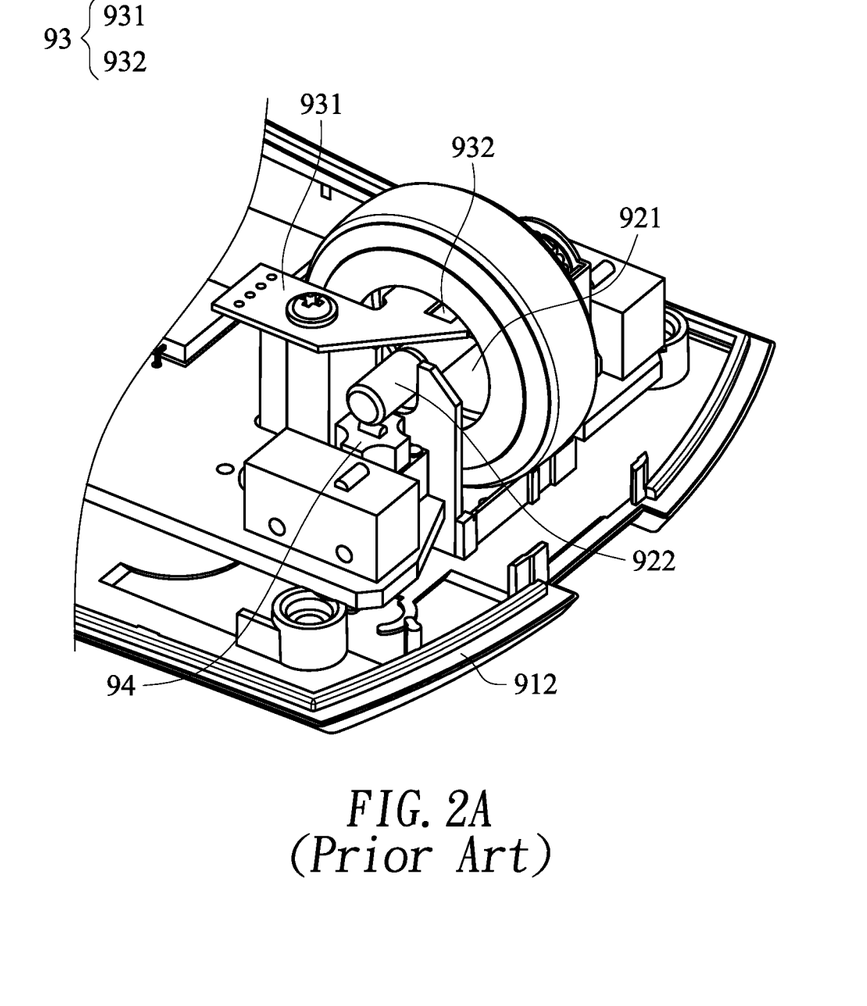
FIG. 2A and FIG. 2B are schematic three-dimensional view of a structure of a scroll of a conventional mouse.
Figure 2B:
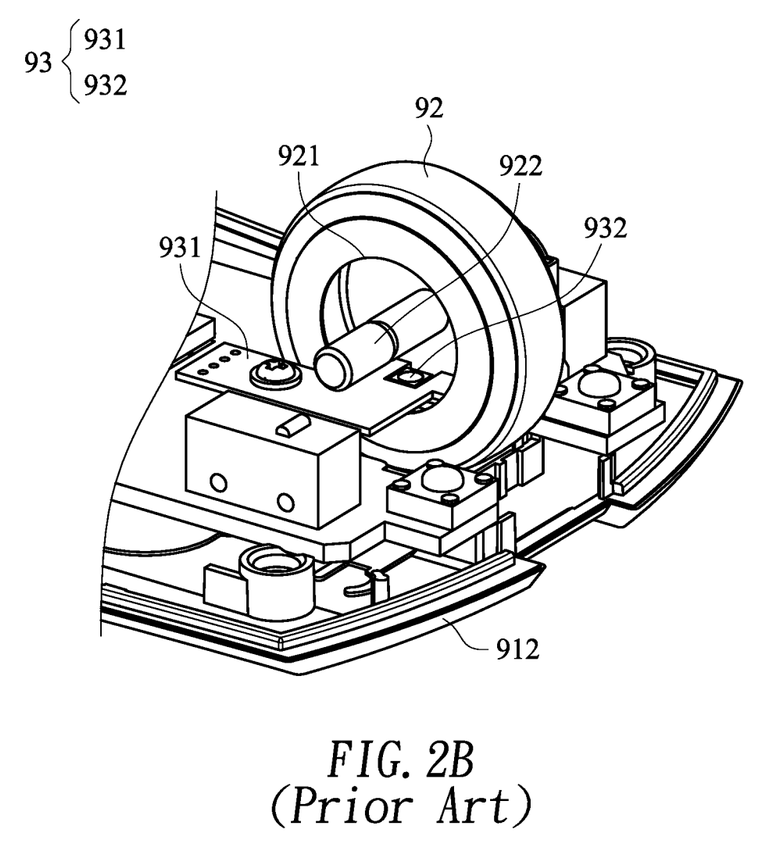

To make users feel more comfortable when using the mouse, many ergonomic designs have also been widely applied in mouse housings. As shown in FIG. 1, a mouse 9 includes: a housing 91 and a scroll 92, where the housing 91 includes an upper cover 911 and a bottom 912, and a control end of the upper cover 911 has a tilt design from upper right to bottom left, so that a user may rest fingers more comfortably. In addition, to improve the convenience of mouse operation in a dark environment and attract more attention from consumers, the scroll 92 usually has a lighting function. As shown in FIG. 2A and FIG. 2B, the scroll 92 has a groove 921, and a rotating shaft 922 protrudes from a bottom surface of the groove; a luminous module 93 includes: a circuit board 931 and a luminous unit 932, where the luminous unit 932 is arranged in the groove 921, and is used to emit light to the scroll 92, so that the scroll 92 produces a luminous visual effect. A middle button switch module 94 is disposed below the rotating shaft 922.

In the prior art, when the luminous module 93 is disposed above the rotating shaft 922 (as shown in FIG. 2A), the luminous module 93 may be too close to the upper cover 911, thereby affecting the tilt design of the upper cover 911. When the scroll 92 is pressed, the luminous module 93 does not descend along with the scroll 92, so that the luminous unit 932 is too close to or in contact with an inner circumference of the groove 921, and therefore, the luminance produced by the scroll 92 changes, or light leakage even occurs. If the luminous unit 932 is too close to or in contact with the inner circumference of the groove 921, an extra rubber cap (not shown) needs to be disposed on the circuit board 931 near the luminous unit 932 to prevent damage to the luminous unit 932 caused by electrostatic discharge (ESD).

However, when the luminous module 93 is disposed below the rotating shaft 922 (as shown in FIG. 2B), the rotating shaft 922 may block the light emitted by the luminous unit 932, resulting in lower luminance of the scroll 92 when the scroll shines.

Therefore, the technical problem to be solved in the present invention is to provide a scroll module, in which a relative arrangement of the rotating shaft and the luminous module does not affect the tilt design of the control end of the mouse, and the rotating shaft does not block the light emitted by the luminous module.

SUMMARY OF THE INVENTION

A main objective of the present invention is to provide a scroll module, in which a relative arrangement of a rotating shaft and a luminous module does not affect a tilt design of a control end of a mouse, and the rotating shaft does not block light emitted by the luminous module, so that luminance of the scroll module can be maintained when the scroll module shines.

To achieve the above objective, the present invention provides a scroll module, applicable to a mouse, including:
a scroll, having a groove, where a bottom surface of the groove has a through axle hole; and
a rotating element, installed in the groove, including:
a rotary disk, having a first surface and a second surface opposite to each other;
a first rotating shaft, disposed at a central position of the first surface; and
a second rotating shaft, disposed at a central position of the second surface;
where the rotary disk is fixed on the bottom surface of the groove and the second rotating shaft passes through the axle hole, and the first rotating shaft has light penetrability.

In the above preferred embodiment, the scroll module further includes a luminous module, where the luminous module includes a circuit board and a luminous unit disposed on one end of the circuit board.

In the above preferred embodiment, the circuit board is partially arranged in the groove, the luminous unit is located below the first rotating shaft, the luminous unit is used to emit light, and the light may penetrate the first rotating shaft and be transmitted to the scroll.

In the above preferred embodiment, one end of the circuit board opposite to the luminous unit is fixed on a bottom of the mouse.

In the above preferred embodiment, the bottom surface of the groove further includes a positioning hole, and the positioning hole is located around the axle hole.

In the above preferred embodiment, the second surface has a positioning bump corresponding to the positioning hole, and the positioning bump passes through the positioning hole to fix the rotary disk.

In the above preferred embodiment, the rotating element is integrally formed, and is made of a transparent material.

In the above preferred embodiment, the first rotating shaft and the second rotating shaft are integrally formed and pass through the central position of the rotary disk, and the first rotating shaft and the second rotating shaft are made of a transparent material.

In the above preferred embodiment, the first rotating shaft is made of a transparent material.

In the above preferred embodiment, an outer circumference of the scroll has an annular groove, and a rim is disposed in the annular groove.

In the above preferred embodiment, the scroll module further includes a round shading element, where the round shading element is used to cover another surface opposite to the groove, and has a central hole corresponding to the second rotating shaft.

In the above preferred embodiment, the scroll module further includes an annular shading element, where the annular shading element is disposed around the groove and used to partially cover the groove.

In the above preferred embodiment, the second rotating shaft has a polygonal shaft, where the polygonal shaft is used to connect an encoder of the mouse.

DETAILED DESCRIPTION OF THE PREFERRED EMBODIMENT

Advantages and features of the present invention and methods of achieving them will become easier to understand with reference to detailed description of exemplary embodiments and accompanying drawings. However, the present invention may be implemented in different forms and shall not be understood as being limited only to the embodiments described herein. On the contrary, for persons of ordinary skill in the art, the embodiments provided herein make the disclosure convey the scope of the present invention in a more thorough, comprehensive and complete manner.

Figure 3:
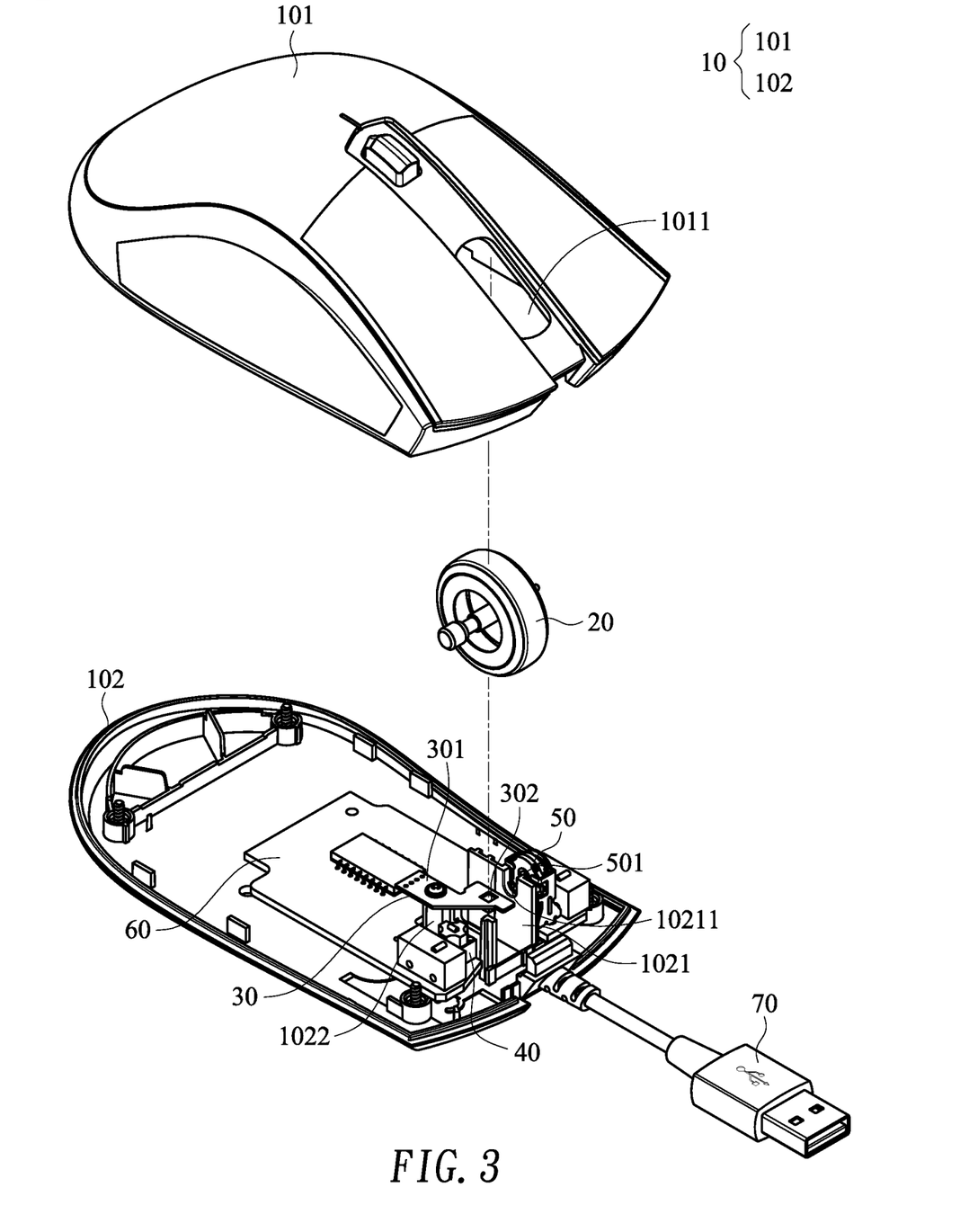
FIG. 3 is a three-dimensional exploded view of a mouse according to the present invention.

First, FIG. 3 is a three-dimensional exploded view of a mouse according to the present invention. In FIG. 1, a mouse 1 includes: a housing 10, a scroll module 20, a luminous module 30, a middle button switch module 40, an encoder 50, a main circuit board 60 and an electrical connector 70.

The housing 10 includes: an upper cover 101 and a bottom 102, and the scroll module 20, the luminous module 30, the middle button switch module 40, the encoder 50 and the main circuit board 60 are all disposed in an inner space formed by combination of the upper cover 101 and the bottom 102. The main circuit board 60 is fixed on the bottom 102, and the middle button switch module 40 and the encoder 50 are disposed on the main circuit board 60.

The bottom 102 has a first support element 1021 and a second support element 1022 which protrude upward from the bottom. The first support element 1021 is located on one side of the encoder 50, and one end away from the bottom 102 of the first support element 1021 has a slide hole 10211, where the slide hole 10211 corresponds to a polygonal axle hole 501 of the encoder 50. The scroll module 20 is pivotally disposed in the slide hole 10211, and may be connected to the encoder 50 through the polygonal axle hole 501. A control end of the upper cover 101 has a through scroll hole 1011, and the scroll module 20 may be partially exposed and protrude from the scroll hole 1011. In addition, the second support element 1022 and the middle button switch module 40 are located on a same side. In this embodiment, the luminous module 30 includes: a circuit board 301 and a luminous unit 302 disposed at an end of the circuit board 301, one end of the circuit board 301 opposite to the luminous unit 302 may be fixed on the second support element 1022 in a locking manner, and one end of the circuit board 301 having the luminous unit 302 is arranged in the scroll module 20. The luminous unit 302 may be: a light-emitting diode unit, an organic light-emitting diode unit, a quantum dot light-emitting diode unit or an electroluminance unit.

The electrical connector 70 is electrically connected to the main circuit board 60, and may be a universal serial bus interface, such as USB 2.0, USB 3.0 or USB 3.1, and is used to output button signals, middle button signals or scroll signals to an electronic device or a computer (not shown, such as a laptop or a personal computer) which is connected to the mouse 1. This embodiment only proposes an implementation in which the electronic device or the computer is connected by using a wired electrical connector 70, but in practical applications, the electrical connector 70 may also be replaced by an existing wireless connection module. This shall not be limited by the implementation proposed in this embodiment.

When a user rolls the scroll module 20, the scroll module 20 may drive the encoder 50 at the same time, so that the encoder 50 may sense a rotation distance, a rotation direction and a rotation speed of the scroll module 20, and output a corresponding scroll signal; and when a user presses the scroll module 20, the scroll module 20 may move downward along the slide hole 10211, and press the middle button switch module 40 to output a corresponding middle button signal.

Figure 4A:
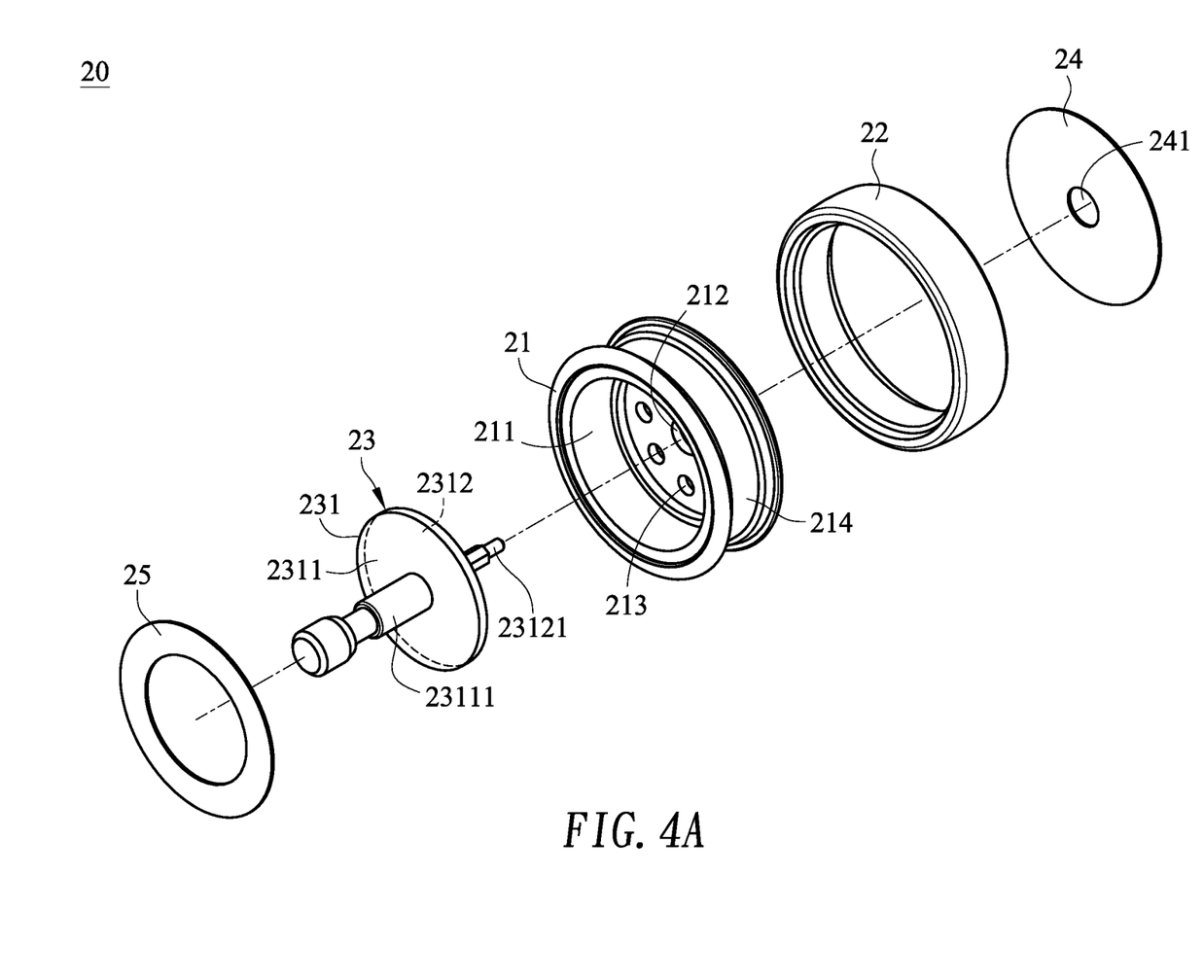
FIG. 4A is a three-dimensional exploded view of a scroll module from a visual angle according to the present invention.
Figure 4B:
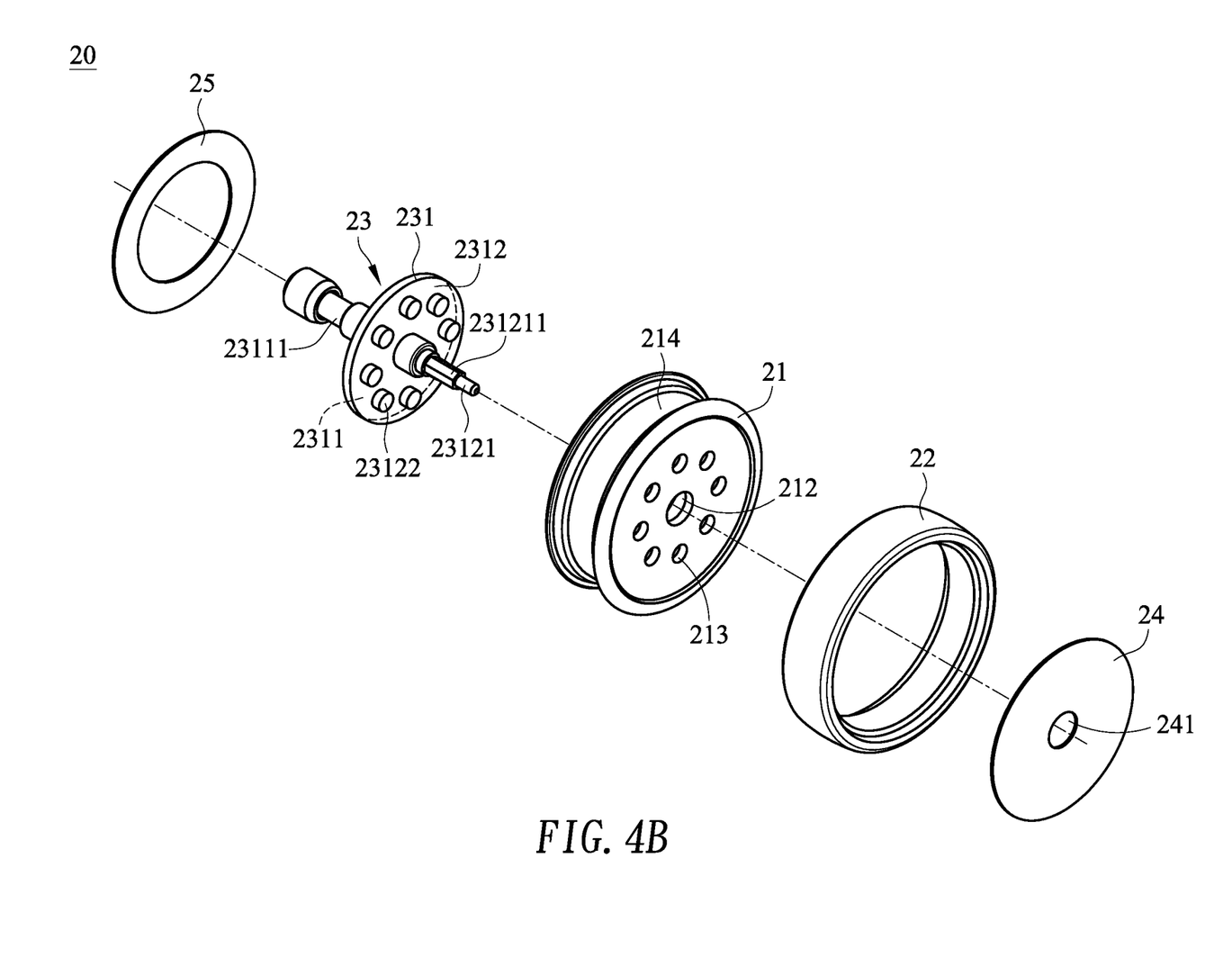
FIG. 4B is a three-dimensional exploded view of the scroll module from another visual angle according to the present invention.

With reference to FIG. 4A and FIG. 4B, FIG. 4A is a three-dimensional exploded view of a scroll module from a visual angle according to the present invention, and FIG. 4B is a three-dimensional exploded view of the scroll module from another visual angle according to the present invention. The scroll module 20 includes: a scroll 21, a rim 22, a rotating element 23, a round shading element 24 and an annular shading element 25.

The scroll 21 includes: a groove 211 and an annular groove 214. A bottom surface of the groove 211 has a through axle hole 212 and one or more positioning holes 213 around the axle hole 212. The annular groove 214 is disposed on an outer circumference of the scroll 21, and the rim 22 may be disposed in the annular groove. In this embodiment, the rim 22 may be made of a light-proof elastic material to increase a friction force on the surface of the scroll 21, and to provide a good pressing feel.

The rotating element 23 includes: a rotary disk 231, a first rotating shaft 23111, a second rotating shaft 23121 and one or more positioning bumps 23122. The rotary disk 231 has a first surface 2311 and a second surface 2312 opposite to each other, the first rotating shaft 23111 is disposed at a central position of the first surface 2311, the second rotating shaft 23121 is disposed at a central position on the second surface 2312, and the positioning bump 23122 is disposed on the second surface 2312 and around the second rotating shaft 23121. A position, a shape or a quantity of the positioning bump 23122 corresponds to a position, a shape or a quantity of the positioning hole 213 on the bottom surface of the groove 211. When the rotating element 23 is installed in the groove 211, the second surface 2312 of the rotary disk 231 faces the bottom surface of the groove 211, the second rotating shaft 23121 and the positioning bump 23122 pass through the axle hole 212 and the positioning hole 213 respectively, and the rotary disk 231 may be fixed on the bottom surface of the groove 211 by using combination of the positioning bump 23122 and the positioning hole 213. This embodiment only proposes an implementation in which the rotating element 23 and the scroll 21 are assembled by using the combination of the positioning bump 23122 and the positioning hole 213, but in practical applications, the positioning bump 23122 may be disposed on the bottom surface of the groove 211, and the positioning hole 213 may be disposed on the rotary disk 231. Alternatively, it is not needed to dispose the positioning hole 213 on the bottom surface of the groove 211, and to dispose a corresponding positioning bump 23122 on the second surface 2312 of the rotary disk 231. Instead, the rotary disk 231 may be fixed on the bottom surface of the groove 211 by the means of glueing or clamping.

The second rotating shaft 23121 has a polygonal shaft 231211 corresponding to the polygonal axle hole 501 (as shown in FIG. 3) of the encoder 50. When the scroll 21 is installed, the second rotating shaft 23121 passes in sequence through the slide hole 10211 of the support element 1021 and the polygonal axle hole 501 of the encoder 50, and the polygonal shaft 231211 passes through and is fixed in the polygonal axle hole 501. Therefore, when the scroll module 20 rotates, the rotating element 23 may drive the encoder 50 to rotate.

Referring again to FIG. 4A and FIG. 4B, the rotating element 23 is integrally formed, and is made of a transparent material, so that the light can penetrate the rotating element 23. In another possible implementation, the first rotating shaft 23111 and the second rotating shaft 23121 are integrally formed, and pass through a central position of a rotary disk 231, and the first rotating shaft 23111 and the second rotating shaft 23121 are made of a transparent material. The rotary disk 231 is made of a light-proof material. In another possible implementation, the first rotating shaft 23111 is made of a transparent material, and is fixed at a central position on the first surface 2311 of the rotary disk 231; and the rotary disk 231 is made of a light-proof material.

The round shading element 24 is used to cover another surface opposite to the groove 211, and has a central hole 241 corresponding to the second rotating shaft 23121. The annular shading element 25 is disposed around the groove 211, and partially covers an edge of the groove 211.

Figure 5:
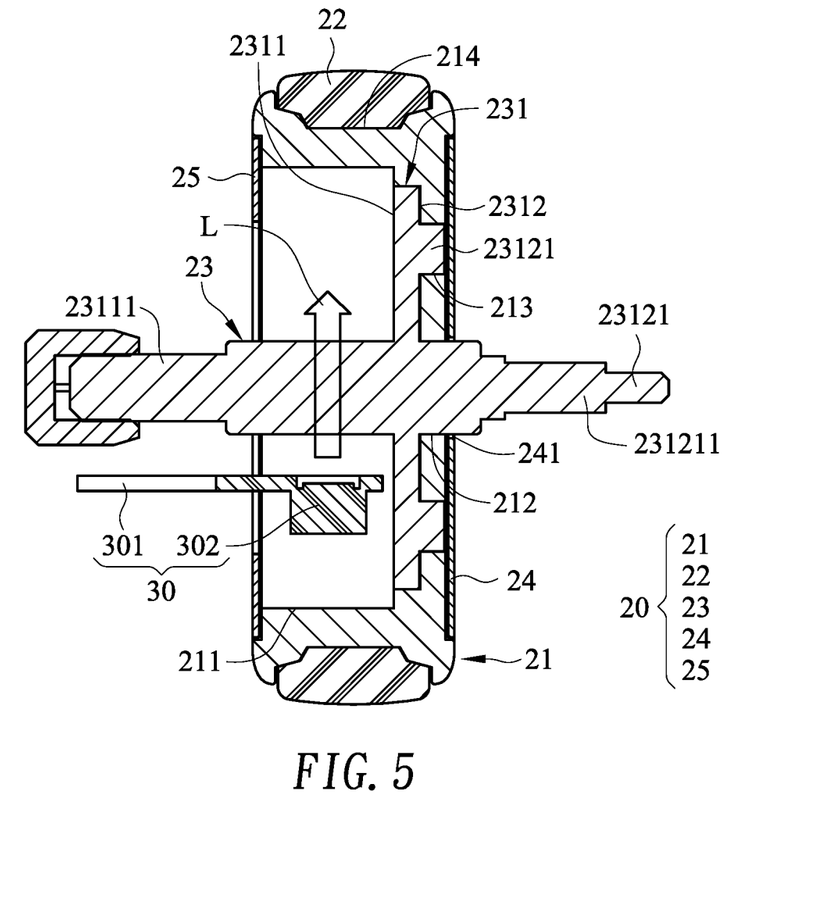
FIG. 5 is a schematic diagram of the scroll module when the scroll module shines.

FIG. 5 is a schematic diagram of the scroll module when the scroll module shines. One end of the circuit board 301 is partially arranged in the groove 211, and the luminous unit 302 of the luminous module 30 is located below the first rotating shaft 23111. The luminous unit 302 is used to emit light L, and the light L may penetrate the first rotating shaft 23111 and be transmitted to the scroll 21. The round shading element 24 and the annular shading element 25 are used to cover two opposite sides of the scroll 21, so as to prevent or reduce the dissipation of the light L from the two opposite sides of the scroll 21. After the light L is transmitted to the scroll 21, the light L may come out from an area which is not covered by the round shading element 24, the annular shading element 25 and the rim 22, so that the scroll module 20 may produce a luminous visual effect. To improve the luminous efficiency of the scroll module 20, in a possible implementation, a light diffusion agent or titanium dioxide may be added when the scroll 21 is produced to improve the luminance and uniformity when the scroll 21 shines. In another possible implementation, the rim 22 may be made of a light-transmissive elastic material. After the light L is transmitted to the scroll 21, the light may penetrate from a position where the rim 22 is disposed, so that the luminous scope of the scroll 21 is increased.

Compared with a mouse scroll structure in conventional technologies, the rotating shaft of the scroll module provided in the present invention has light penetrability. When the luminous module is disposed below the rotating shaft, the light produced by the luminous module may penetrate the rotating shaft which has the light penetrability, and be transmitted to the scroll, so that the luminance and the uniformity when the scroll module shines may be maintained. The luminous module is disposed below the rotating shaft, so that the tilt design of the control end of the mouse is not affected. In addition, the luminous unit of the luminous module may be far away from the inner circumference of the scroll groove, so that the damage of the luminous unit caused by the electrostatic discharge may be effectively avoided. Therefore, the present invention is actually a creation with great industrial value.

Persons of ordinary skill in the art may make variations and modifications to the present invention without departing from the protection scope defined by the appended claims.

What is claimed is:

1. A scroll module, applicable to a mouse, comprising:
   a scroll, having a groove, wherein a bottom surface of the groove has a through axle hole; and
   a rotating element, installed in the groove, comprising:
      a rotary disk, having a first surface and a second surface opposite to each other;
      a first rotating shaft, disposed at a central position of the first surface;
      a second rotating shaft, disposed at a central position of the second surface; and
      at least one luminous unit that emits light;
   wherein the rotary disk is fixed on the bottom surface of the groove and the second rotating shaft passes through the axle hole, and the light penetrates the first rotating shaft to transmit the light to the scroll.

2. The scroll module according to claim 1, further comprising a luminous module, wherein the luminous module comprises a circuit board and the at least one luminous unit disposed on one end of the circuit board.

3. The scroll module according to claim 2, wherein the circuit board is partially arranged in the groove, the at least one luminous unit is located below the first rotating shaft.

4. The scroll module according to claim 2, wherein one end of the circuit board opposite to the at least one luminous unit is fixed on a bottom of the mouse.

5. The scroll module according to claim 1, wherein the bottom surface of the groove further comprises at least one positioning hole, and the at least one positioning hole is located around the axle hole.

6. The scroll module according to claim 5, wherein the second surface has at least one positioning bump corresponding to the at least one positioning hole, and the at least one positioning bump passes through the at least one positioning hole to fix the rotary disk.

7. The scroll module according to claim 1, wherein the rotating element is integrally formed, and is made of a transparent material.

8. The scroll module according to claim 1, wherein the first rotating shaft and the second rotating shaft are integrally formed and pass through the central position of the rotary disk, and the first rotating shaft and the second rotating shaft are made of a transparent material.

9. The scroll module according to claim 1, wherein the first rotating shaft is made of a transparent material.

10. The scroll module according to claim 1, wherein an outer circumference of the scroll has an annular groove, and a rim is disposed in the annular groove.

11. The scroll module according to claim 1, further comprising a round shading element, wherein the round shading element is used to cover another surface opposite to the groove, and has a central hole corresponding to the second rotating shaft.

12. The scroll module according to claim 1, further comprising an annular shading element, wherein the annular shading element is disposed around the groove and is used to partially cover the groove.

13. The scroll module according to claim 1, wherein the second rotating shaft has a polygonal shaft, and the polygonal shaft is used to connect an encoder of the mouse.

* * * * *